Patented June 11, 1935

2,004,350

UNITED STATES PATENT OFFICE 2,004,350

CONDENSATION OF ALCOHOLS

Norman D. Scott, Niagara Falls, N. Y., assignor to E. I. du Pont de Nemours & Company, Wilmington, Del., a corporation of Delaware No Drawing. Application December 2, 1931, Serial No. 578,609

21 Claims. (Cl. 280—156)

This invention relates to the conversion of alcohols to esters and to other alcohols of higher molecular weight.

It has heretofore been proposed to convert primary alcohols into esters by first converting the alcohol into its aldehyde by oxidation or dehydrogenation, and thereafter converting the aldehyde to ester by condensation. It is also known that butanol can be made from ethanol by converting the ethanol successively to acetaldehyde, to aldol, to crotonaldehyde and finally by hydrogenation, to butanol. It has also been proposed to convert ethanol to butanol by a vapor phase reaction in the presence of a catalyst at high temperatures and high pressure. These processes in general require several distinct operating steps and/or produce considerable amounts of undesirable by-products through troublesome side reactions.

An object of this invention is to improve the process for the conversion of lower alcohols, for example ethyl alcohol, into higher alcohols, for example butanol, and into esters, for example ethyl acetate, by a one step process. A further object of this invention, is to improve the above alcohol condensations by the substantially complete elimination of the formation of gaseous by-products such as olefines, ethers, oxides of carbon, etc.

These objects may be accomplished by heating a lower alcohol, for example ethyl alcohol, in the liquid phase and under pressure while in the presence of a dehydrogenating catalyst, with or without a condensing catalyst.

The invention is particularly suited to the conversion of ethyl alcohol to butanol and/or ethyl acetate; but the invention is not restricted to the treatment of ethyl alcohol and may be also applied to other alcohols, both aliphatic and cyclic.

Broadly, the invention consists in mixing the desired amount of alcohol with the catalyst material, prepared as hereinafter described, placing the liquid mixture in a suitable bomb or autoclave, which is adapted to permit agitation of the contents, and there heating to the desired temperature. This temperature is preferably 150° C. or above but should be below the critical temperature of the alcohol used as raw material. The reaction may be carried out for varied periods of time, for instance, from about 4 hours to about 22 hours. The reaction products may be separated by distillation or other suitable methods and any unconverted raw material may be recovered and again utilized in the reaction.

The invention will be more specifically illustrated in terms of the conversion of ethyl alcohol to butanol and/or ethyl acetate. The preparation of suitable catalyst material, e. g. a supported metallic dehydrogenating catalyst will now be described.

Example I

A catalyst suitable for converting ethyl alcohol into ethyl acetate and/or butanol is prepared by supporting a copper compound on alumina gel and reducing the compound in hydrogen. A mixture of 12 liters of water, 1170 grams of $Cu(NO_3)_2.3H_2O$, 2300 cc. of $NH_4OH$ (28.5%), and 225 grams of 200 mesh $Al_2O_3$ gel was placed in a 6 gallon enameled pot, heated to 70° C., and agitated by a stream of air. 1170 grams of $Cu(NO_3)_2.3H_2O$, in 2 liters of water was slowly added during a period of 3 hours. The temperature was then maintained at 70° C., while the remaining $NH_3$ was blown out by a rapid stream of air. The catalyst was filtered on a Buchner funnel, washed substantially free from nitrates with about 20 liters of water, dried in an oven at 120° C., and finally reduced in a stream of $H_2$ at 200–550° C., depending on the specific use for which the catalyst is to be employed as will hereinafter be described.

Example II

A copper chromite catalyst was prepared by reacting solutions of cupric nitrate and ammonium dichromate and heating the resultant precipitate to decomposition temperatures, as described by Adkins and Connor, Journal of the American Chemical Society, vol. 53, page 1092 (1931), and reduced with hydrogen gas at 400° C.

Example III

The conversion of ethyl alcohol to a product consisting chiefly of ethyl acetate by means of the catalyst of Example I was carried out as follows:

450 cc. of dry ethyl alcohol and 35 grams of the supported copper catalyst of Example I, reduced in hydrogen at 250° C., were placed in a copper lined steel bomb of 2800 cc. capacity. The mixture was heated to 220° C. and agitated for 22 hours. Of the ethanol condensed, about 97% was converted to ethyl acetate and the remainder to a mixture of higher alcohols. Less than 1% of the raw material reacting was degraded to gas.

To condense an alcohol to form chiefly higher alcohols, for instance to produce butanol and higher alcohols from ethanol, I combine a dehydrogenating catalyst such as described in Examples I and II, with a condensing catalyst. Potassium carbonate, or caesium carbonate, with or without dehydrating catalysts, such as aluminum oxide, may be employed as condensing catalysts. The catalyst of Example I, reduced in $H_2$ at 400–550° C., and mixed with about ½ its weight of $K_2CO_3$, with or without alumina, is particularly effective. This process produces some other compounds such as ethyl acetate along with the higher alcohols. The amounts or ratios of the higher alcohols and the amount of acetate or the like produced will depend on the catalyst and the variations in the operating details.

*Example IV*

A mixture of 450 cc. of dry ethanol, 35 grams of the supported copper catalyst described in Example I which had been reduced with hydrogen at 500° C., 20 grams potassium carbonate and 10 grams of $Al_2O_3$ gel were mechanically mixed and introduced into a 2800 cc. copper lined steel bomb. This mixture was heated and agitated at 200° C., while under a hydrogen partial pressure of 100 lbs. per square inch, for 20 hours. Of the ethanol reacted, about 65% was converted to butanol, about 17% to hexanol, and about 14% to alcohols higher than hexanol; less than 3% was converted to ethyl acetate. Substantially no raw material was degraded to gas.

*Example V*

450 cc. of dry ethanol, 70 grams of supported copper catalyst reduced at 500° C., 20 grams of $K_2CO_3$ and 10 grams of $Al_2O_3$ gel were placed in a closed reaction vessel of 2800 cc. capacity. The mixture was heated to 220° C. with agitation for 4 hours, under a hydrogen partial pressure of about 100 lbs. per square inch. Subsequent distillation of the reaction mixture yielded 36 cc. of butanol, 10 cc. of alcohols higher than butanol and 2.4 cc. of ethyl acetate. The amount of alcohol converted to gases was negligible.

*Example VI*

450 cc. of dry ethanol, 50 grams of the copper chromite catalyst of Example II, 20 grams of $K_2CO_3$ and 10 grams of $Al_2O_3$ gel were placed in a closed reaction vessel of 2800 cc. capacity and were heated at 220° C. with agitation under a hydrogen partial pressure of about 100 lbs. per square inch for 22 hours. Subsequent distillation of the reaction mixture yielded 58 cc. of butanol, 18.8 cc. of hexanol, 17 cc. of alcohols higher than hexanol and 13.3 cc. of ethyl acetate. Substantially no gaseous products were formed.

My invention is capable of wide variation and applicability; in addition to the condensation of ethanol to ethyl acetate or butanol, other aliphatic or cyclic alcohols may be similarly condensed to higher alcohols and esters; thus, the following condensations have been successfully carried out:

| Alcohols | Condensation products |
|---|---|
| 1. Normal propanol | 2 methyl pentanol 1+water. |
| 2. Normal butanol | 2 ethyl hexanol 1+water. |
| 3. Ethanol+n. propanol | Normal and "active" amyl alcohols as well as the condensation products obtained using ethanol or propanol separately. |
| 4. Isopropyl alcohol | 2 methyl pentanol 4+water. |
| 5. Cyclo hexanol | Cyclohexyl cyclo hexanol+water. |
| 6. Normal propanol | Propyl propionate+hydrogen. |

In the preparation of esters, the condensation may be performed on a single alcohol, e. g. ethyl alcohol, or a mixture of alcohols, at least one of which must be a primary alcohol.

In the condensation of alcohols to other alcohols of higher molecular weight, one may start with a primary alcohol, a secondary alcohol or mixtures of such alcohols. It is necessary in such utilizations to have present at least one alcohol having two hydrogen atoms on the alpha carbon atom, i. e., the carbon atom next to that having the hydroxyl group.

When one is reacting mixtures of alcohols it is understood that the temperature employed will be sufficiently low to maintain a liquid phase in the closed system.

While I prefer to employ the catalysts given in the above examples, the supported copper catalyst may be replaced by other dehydrogenating catalysts, for example, by supported nickel, prepared similarly to the copper catalyst in Example I. Nickel has a disadvantage, however, in that it produces a relatively larger amount of gaseous by-products than does copper, apparently because of its more active dehydrogenating character.

The temperature at which the dehydrogenating catalyst is reduced materially affects the course of the reaction. Thus, if the copper catalyst of Example I is reduced at 200 to 240° C., it functions primarily as a catalyst for the production of esters. As its activity is decreased by heating in hydrogen at higher temperatures, for example at 400–550° C., it becomes less effective as an ester forming catalyst and more suitable for higher alcohol forming catalyst. If the dehydrogenating catalyst reduced at higher temperatures is combined with a condensing catalyst such as potassium carbonate, and with or without a dehydrating catalyst such as alumina, it produces alcohols almost exclusively. If the desired end-product is an ester, it is preferable that the catalyst contain not more than a trace of alkaline material.

Other condensing catalysts may replace the potassium carbonate or caesium carbonate. Potassium hydroxide is effective, but apparently not as permanent, since it is converted to a potassium salt of an organic acid during the course of the reaction. $K_2SiO_3$ and NaOH may also be used as condensing catalysts. Other dehydrating catalysts, e. g. thoria, may replace the alumina; or the dehydrating catalyst may be entirely omitted, although its use is advantageous.

In producing alcohols, I prefer to employ the dehydrogenating catalyst, e. g. copper reduced at 400–550° C., and the condensing catalyst, e. g. the potassium hydroxide or carbonate, in a ratio of around 2:1. With this ratio and other conditions of temperature, etc. being suitable, the reaction product is mainly composed of alcohols formed by condensation of two molecules of the starting material. However, if the proportion of condensing catalyst is materially increased above this ratio, large amounts of alcohols formed by the condensation of three or more molecules of the raw material are produced. For instance, in the condensation of ethanol with a catalyst containing reduced copper catalyst and $K_2CO_3$ in a ratio of about 1:20, the reaction product contained about 38% of butanol and 62% of normal hexanol and higher alcohols. While I have employed amounts of 10% and more by weight of catalyst, I have found that the reaction will proceed satisfactorily with as little as 3% by weight.

The reaction may be carried out at temperatures from 150° C. to the critical temperature of the alcohol employed. I prefer, however, to employ a temperature of about 200–230° C., for although the higher temperature increases the reaction rate, it also apparently decreases the permanence of the catalyst and the selectivity as between the formation of esters and of higher alcohols, and hence is not so desirable.

The pressure in the autoclave is determined primarily by the vapor pressure of the liquids at the temperatures employed; in general this will be from 150 to 1000 pounds per square inch. The addition of hydrogen at a partial pressure of around 100 pounds per square inch is beneficial in condensing lower to higher alcohols. The total pressure used will therefore range in general from about 150 to 1000 pounds per square inch. When the process is carried out to produce an ester with hydrogen as a by-product, it is preferable to keep the partial pressure of hydrogen as low as practicable by venting the hydrogen as formed.

While the alcohols may contain up to 8–10% water and still produce substantial amounts of the desired products, the reactions are faster if substantially anhydrous alcohols are employed. The presence of carbon monoxide in substantial amounts should be avoided as it apparently retards the rate of reaction.

Pronounced agitation of the reacting mixture is materially advantageous. This may be accomplished by rotating or shaking the reactor or by a mechanical agitator introduced within the reactor.

The advantages of this invention reside in the simplicity of employing a one step conversion from lower alcohols to higher alcohols or esters, and also in the extremely low percentage of conversion of the reactance to undesirable and useless gaseous by-products. In the majority of numerous trials, I have found that 0.25% or less of the reactants were converted to such useless products and only on rare occasions has the amount converted to gases been as high as 0.5 to 0.8%.

It is understood that in the specification and claims the term "alcohol" is employed in its generic sense and is not restricted to any particular alcohol.

I claim:

1. The process for producing organic condensation products comprising heating an alcohol of the group consisting of aliphatic and alicyclic alcohols having at least two hydrogen atoms on the alpha carbon atom to a temperature above about 150° C. in the liquid phase under a pressure above atmospheric in the presence of a dehydrogenating catalyst and a condensing catalyst comprising essentially an alkaline alkali metal compound.

2. The process for producing higher alcohols comprising heating an alcohol of the group consisting of aliphatic and alicyclic alcohols having at least two hydrogen atoms on the alpha carbon atom in the liquid phase at a temperature between 150° C. and the critical temperature of said alcohol under a pressure approximately equal to the corresponding vapor pressure of the liquid in the presence of a dehydrogenating catalyst of the group consisting of reduced copper, reduced nickel and mixtures thereof with non-reducible metal oxides and a condensing catalyst comprising essentially an alkaline alkali metal compound.

3. The process for producing higher alcohols comprising heating an alcohol of the group consisting of aliphatic and alicyclic alcohols having at least two hydrogen atoms on the alpha carbon atom in the liquid phase at a temperature between 150° C. and the critical temperature of said alcohol under a pressure approximately equal to the corresponding vapor pressure of the liquid in the presence of a dehydrogenating catalyst of the group consisting of reduced copper, reduced nickel and mixtures thereof with non-reducible metal oxides, said catalyst having been heated to a temperature of from 400° to 550° C. and a condensing catalyst comprising essentially an alkaline substance of the group consisting of alkali metal carbonates and alkali metal hydroxides.

4. The process for producing higher alcohols comprising heating an alcohol of the group consisting of aliphatic and alicyclic alcohols having at least two hydrogen atoms on the alpha carbon atom in the liquid phase at a temperature between 150° C. and the critical temperature of said alcohol under a pressure above atmospheric in the presence of a dehydrogenating catalyst, a condensing catalyst comprising essentially an alkaline alkali metal compound and a dehydrating catalyst.

5. The process for producing organic condensation products comprising heating an alcohol of the group consisting of aliphatic and alicyclic alcohols having at least two hydrogen atoms on the alpha carbon atom in the liquid phase at 200° to 230° C. under a pressure of 150–1000 pounds per square inch in the presence of about two parts by weight of a dehydrogenating catalyst and one part of a condensing catalyst comprising essentially an alkaline alkali metal compound.

6. The process for producing higher alcohols comprising heating an alcohol of the group consisting of aliphatic and alicyclic alcohols having at least two hydrogen atoms on the alpha carbon atom in the liquid phase at 200° to 230° C. under a pressure of 150–1000 pounds per square inch in the presence of about two parts by weight of a dehydrogenating catalyst of the group consisting of reduced copper, reduced nickel and mixtures thereof with non-reducible metal oxides and one part of a condensing catalyst comprising essentially an alkaline alkali metal compound.

7. The process for producing higher alcohols comprising heating an alcohol of the group consisting of aliphatic and alicyclic alcohols having at least two hydrogen atoms on the alpha carbon atom in the liquid phase at 200° to 230° C. under a pressure of 150–1000 pounds per square inch in the presence of about two parts by weight of a dehydrogenating catalyst of the group consisting of reduced copper, reduced nickel and mixtures thereof with non-reducible metal oxides, said catalyst having been heated to a temperature of from 400° to 550° C. and one part by weight of a condensing catalyst comprising essentially an alkaline substance of the group consisting of alkali metal carbonates and alkali metal hydroxides.

8. The process for producing higher alcohols comprising heating an alcohol of the group consisting of aliphatic and alicyclic alchols having at least two hydrogen atoms on the alpha carbon atom in the liquid phase at 200° to 230° C. under a pressure of 150–1000 pounds per square inch in the presence of about two parts by weight of a dehydrogenating catalyst of the group consisting of reduced copper, reduced nickel and mixtures thereof with non-reducible metal oxides, said catalyst having been heated to a temperature of from 400° to 550° C. and one part by weight of a condensing catalyst comprising essentially an alkaline substance of the group consisting of alkali metal carbonates and alkali metal hydroxides in the presence of a dehydrating catalyst comprising essentially one of the group alumina and thoria.

9. The process for producing higher alcohols comprising heating an alcohol of the group consisting of aliphatic and alicyclic alcohols having at least two hydrogen atoms on the alpha carbon atom to a temperature of above about 150° C. in the liquid phase under a pressure above atmospheric in the presence of a dehydrogenating catalyst and a condensing catalyst comprising essentially an alkaline alkali metal compound while applying additional pressure above the vapor pressure of the liquid by means of hydrogen.

10. The process for producing higher alcohols comprising heating an alcohol of the group consisting of aliphatic and alicyclic alcohols having at least two hydrogen atoms on the alpha carbon atom in the liquid phase at a temperature between 150° C. and the critical temperature of said alcohol under a pressure above atmospheric in the presence of a dehydrogenating catalyst, a condensing catalyst comprising essentially an alkaline alkali metal compound and a dehydrating catalyst while applying additional pressure above the vapor pressure of the liquid by means of hydrogen.

11. The process for producing higher alcohols comprising heating an alcohol of the group consisting of aliphatic and alicyclic alcohols having at least two hydrogen atoms on the alpha carbon atom in the liquid phase at 200° to 230° C. under a pressure of 150–1000 pounds per square inch in the presence of about two parts by weight of a dehydrogenating catalyst and one part by weight of a condensing catalyst comprising essentially an alkaline alkali metal compound while applying additional pressure above the vapor pressure of the liquid by means of hydrogen.

12. The process for producing higher alcohols comprising heating an alcohol of the group of aliphatic and alicyclic alcohols having at least two hydrogen atoms on the alpha carbon atom in the liquid phase at 200° to 230° C. under a pressure of 150–1000 pounds per square inch in the presence of about two parts by weight of a dehydrogenating catalyst of the group consisting of reduced copper, reduced nickel, and mixtures thereof with non-reducible metal oxides, said catalyst having been heated to a temperature of from 400° to 550° C. and one part by weight of a condensing catalyst comprising essentially an alkaline substance of the group consisting of alkali metal carbonates and alkali metal hydroxides while applying additional pressure above the vapor pressure of the liquid by means of hydrogen under a partial pressure of about 100 pounds per square inch.

13. The process for producing higher alcohols from an alcohol of the group consisting of aliphatic and alicyclic alcohols having 2 hydrogen atoms on the alpha carbon atom, comprising heating said alcohol in the liquid phase to a temperature above about 150° C. under a pressure above atmospheric in the presence of a dehydrogenating catalyst and a condensing catalyst comprising essentially an alkaline alkali metal compound.

14. The process for producing higher alcohols from an alcohol of the group consisting of aliphatic and alicyclic alcohols having 2 hydrogen atoms on the alpha carbon atom, comprising heating said alcohol in the liquid phase to a temperature above about 150° C. under a pressure above atmospheric in the presence of a dehydrogenating catalyst and a condensing catalyst comprising essentially an alkaline alkali metal compound while applying additional pressure above the vapor pressure of the liquid by means of hydrogen.

15. The process for producing higher alcohols from an alcohol of the group consisting of aliphatic and alicyclic alcohols having 2 hydrogen atoms on the alpha carbon atom, comprising heating said alcohol in the liquid phase at a temperature between 150° C. and the critical temperature of said alcohol under a pressure approximately equal to the corresponding vapor pressure of the liquid in the presence of a dehydrogenating catalyst of the group consisting of reduced copper, reduced nickel and mixtures thereof with non-reducible metal oxides, said catalyst having been heated to a temperature of from 400° C. to 550° C., and a condensing catalyst comprising essentially an alkaline substance of the group consisting of alkali metal carbonates and alkali metal hydroxides.

16. The process for producing higher alcohols which comprises heating ethyl alcohol in the liquid phase to a temperature above about 150° C. under a pressure above atmospheric in the presence of a dehydrogenating catalyst and a condensing catalyst comprising essentially an alkaline alkali metal compound.

17. The process for producing higher alcohols which comprises heating ethyl alcohol in the liquid phase at a temperature between 150° C. and the critical temperature of said alcohol under a pressure above atmospheric in the presence of a dehydrogenating catalyst, a condensing catalyst comprising essentially an alkaline alkali metal compound and a dehydrating catalyst.

18. The process for producing higher alcohols which comprises heating ethyl alcohol in the liquid phase at 200° to 230° C. under a pressure of 150–1000 pounds per square inch in the presence of about 2 parts by weight of a dehydrogenating catalyst of the group consisting of reduced copper, reduced nickel and mixtures thereof with non-reducible metal oxides, said catalyst having been heated to a temperature of from 400° to 550° C. and one part by weight of a condensing catalyst comprising essentially an alkaline substance of the group consisting of alkali metal carbonates and alkali metal hydroxides in the presence of a dehydrating catalyst comprising essentially one of the group alumina and thoria.

19. The process for producing higher alcohols which comprises heating ethyl alcohol in the liquid phase to a temperature above about 150° C. under a pressure above atmospheric in the presence of a dehydrogenating catalyst and a condensing catalyst comprising essentially an alkaline alkali metal compound while applying additional pressure above the vapor pressure of the liquid by means of hydrogen.

20. The process for producing higher alcohols comprising heating a mixture of alcohols of the group consisting of aliphatic and alicyclic alcohols in the liquid phase at least one of said alcohols having at least two hydrogen atoms on the alpha carbon atom at a temperature between 150° C. and the critical temperature of said alcohol under a pressure approximately equal to the corresponding vapor pressure of the liquid in the presence of a dehydrogenating catalyst of the group consisting of reduced copper, reduced nickel and mixtures thereof with non-reducible metal oxides and a condensing catalyst comprising essentially an alkaline alkali metal compound.

21. The process for producing higher alcohols comprising heating a mixture of alcohols of the group consisting of aliphatic and alicyclic alcohols in the liquid phase at least one of said alcohols having at least two hydrogen atoms on the alpha carbon atom at 200° to 230° C. under a pressure of 150–1000 pounds per square inch in the presence of about 2 parts by weight of a dehydrogenating catalyst of the group consisting of reduced copper, reduced nickel and mixtures thereof with non-reducible metal oxides, said catalyst having been heated to a temperature of from 400° to 550° C. and one part by weight of a condensing catalyst comprising essentially an alkaline substance of the group consisting of alkali metal carbonates and alkali metal hydroxides in the presence of a dehydrating catalyst comprising essentially one of the group alumina and thoria.

NORMAN D. SCOTT.